United States Patent
García Ramos et al.

(10) Patent No.: US 12,543,949 B2
(45) Date of Patent: Feb. 10, 2026

(54) SYSTEM FOR MEASURING CLINICAL PARAMETERS OF VISUAL FUNCTION

(71) Applicant: E-Health Technical Solutions, S.L., Barcelona (ES)

(72) Inventors: Eva García Ramos, Barcelona (ES); Juan Carlos Ondategui Parra, Barcelona (ES)

(73) Assignee: E-Health Technical Solutions, S.L., Barcelona (ES)

( * ) Notice: Subject to any disclaimer, the term of this patent is extended or adjusted under 35 U.S.C. 154(b) by 528 days.

(21) Appl. No.: 17/614,869

(22) PCT Filed: May 29, 2019

(86) PCT No.: PCT/ES2019/070356
§ 371 (c)(1),
(2) Date: Nov. 29, 2021

(87) PCT Pub. No.: WO2020/240052
PCT Pub. Date: Dec. 3, 2020

(65) Prior Publication Data
US 2022/0240775 A1    Aug. 4, 2022

(51) Int. Cl.
*A61B 3/11*    (2006.01)
*A61B 3/00*    (2006.01)
*A61B 3/113*    (2006.01)

(52) U.S. Cl.
CPC ............ *A61B 3/112* (2013.01); *A61B 3/0025* (2013.01); *A61B 3/0041* (2013.01); *A61B 3/113* (2013.01)

(58) Field of Classification Search
CPC ..... A61B 3/112; A61B 3/0025; A61B 3/0041; A61B 3/113; A61B 3/09; A61B 3/111;
(Continued)

(56) References Cited

U.S. PATENT DOCUMENTS

| | | | |
|---|---|---|---|
| 2011/0025611 A1* | 2/2011 | Yoo | A61B 3/032 345/173 |
| 2014/0265460 A1* | 9/2014 | Voigt | A47C 7/72 297/170 |

(Continued)

FOREIGN PATENT DOCUMENTS

WO    2018087408 A1    5/2018

OTHER PUBLICATIONS

WO2018087408 machine translation (Year: 2024).*
(Continued)

*Primary Examiner* — Travis S Fissel
(74) *Attorney, Agent, or Firm* — Knobbe, Martens, Olson & Bear, LLP

(57) ABSTRACT

The measurement system comprises a first display unit configured to represent a scene wherein at least one 2D/3D object has variable characteristics for instilling a visual response in the user, wherein said variable characteristics include at least the virtual position and virtual volume of the 2D/3D object within the scene; an interface configured to enable user interaction; processing means configured to analyze the user response based on the association of data from the interface with varying characteristics of the 2D/3D object represented in the display unit and estimating a plurality of clinical parameters of the user's visual function, and a second display unit also configured to represent a scene wherein the at least one 2D/3D object has variable characteristics for instilling a visual response in the user.

8 Claims, 2 Drawing Sheets

(58) Field of Classification Search
CPC ....... A61B 3/10; A61B 3/0008; A61B 3/0016; A61B 3/005; A61B 3/0058; A61B 3/0075; A61B 3/02; A61B 3/024; A61B 3/028; A61B 3/0285; A61B 3/08
USPC .................................. 351/205–211, 239–245
See application file for complete search history.

(56) References Cited

U.S. PATENT DOCUMENTS

| 2016/0262608 A1 | 9/2016 | Krueger | |
| 2019/0138054 A1* | 5/2019 | Alva | G06F 1/1624 |

OTHER PUBLICATIONS

International Search Report of the International Searching Authority, along with an English translation, mailed on Feb. 19, 2020, issued in connection with International Application No. PCT/ES2019/070356 (7 pages).

Written Opinion of the International Searching Authority mailed on Feb. 19, 2020, issued in connection with International Application No. PCT/ES2019/070356 (4 pages).

MaKenzie, et al., "Accomodation to Mulitple-Focal-Plane Displays: Implications for Improving Stereoscopic Displays and for Accomodation Control," Journal of Vision (2010) vol. 10, No. 8 (20 pages).

* cited by examiner

SYSTEM FOR MEASURING CLINICAL PARAMETERS OF VISUAL FUNCTION

RELATED APPLICATIONS

This application is a U.S. National Phase Application under 35 U.S.C. 371 of International Application No. PCT/ES2019/070356 filed May 29, 2019. The disclosure of this application is incorporated herein by reference in its entirety.

The present invention relates to a system for measuring clinical parameters of visual function.

BACKGROUND OF THE INVENTION

Currently, the measurement of clinical parameters of visual function requires a clinical specialist, who carries out a series of tests and optotypes on the patient during a session. It is common for the personal and manual component of the measurements to provide subjective, poorly reproducible, and purely qualitative results.

Currently the process of clinical stimulation of accommodative function in optometry is manual with a specialist, placing stimuli on a piece of paper or other object to cause the eye to focus its images on the retina at different planes, or by using different negative or positive lenses in the eyes that change the focus of the object.

On the other hand, the measurements are carried out independently according to the visual function to be assessed. This means that the results are sometimes invalid because the influence of other factors is underestimated. For example, it is known that patients tend to compensate for a particular anomaly or deficiency in their visual function by compensating for it with the integral functioning of the rest.

In short, at present, the patient's ability to adapt is not considered, and therefore the actions aimed for detecting or correcting a specific anomaly may result in practice in an overall worsening of the patient's vision. Furthermore, measurements and tests on the patient are affected by the subjectivity of the specialist who carries them out, which significantly limits the reproducibility and concordance of the experimental results obtained.

WO2018087408 A1, by the same proprietor as the present application, describes a system for measuring clinical parameters of visual function, comprising a display unit, comprising a single screen, configured to represent a scene where at least one 3D object has variable characteristics to instill a visual response in the user.

In addition, the system described in this document also comprises a plurality of motion sensors configured to detect the position of the user's head and distance to the display unit and a plurality of tracking sensors configured to detect the position of the user's pupils and pupil diameter.

The system described in this document provides a system for comprehensive measurement of ocular, oculomotor, and visual function parameters, preferably in real time, and for generating training for visual function improvement.

However, the use of a single display limits the stimulation and measurement of the response of the accommodative (focusing) system of visual function, in open or closed field, without the use of ophthalmic lenses, at different distances.

DESCRIPTION OF THE INVENTION

Therefore, an objective of the present invention is to provide a system for measuring clinical parameters of visual function which permits the creation of stimuli (controlled or uncontrolled) as well as the accurate measurement of accommodative responses which permits this stimulation independently of the binocular visual system.

With the measuring system of the invention the above-mentioned disadvantages are solved, presenting other advantages which will be described below.

The system for measuring clinical parameters of visual function according to the present invention comprises:
- a first display unit configured to represent a scene wherein at least one 2D/3D object has variable characteristics to instill a visual response in the user, wherein said variable characteristics include at least the virtual position and virtual volume of the 2D/3D object within the scene;
- an interface configured to allow user interaction on the scene;
- processing means configured to analyze the user response based on the association of the data coming from the interface with the variation of the characteristics of the 2D/3D object represented on the display unit and the estimation of a plurality of clinical parameters of the user's visual function, wherein the system also comprises a second display unit also configured to represent a scene wherein at least one 2D/3D object has variable characteristics to instill a visual response in the user.

For example, such variable characteristics may include at least the virtual position and virtual volume of the 2D/3D object within the scene.

Optionally, the system can also comprise:
- a plurality of motion sensors configured to detect the position of the user's head and the distance to the display unit;
- a plurality of tracking sensors configured to detect the position of the user's pupils and the diameter of the pupils;

Preferably, according to a possible embodiment, said second display unit is smaller than said first display unit, although it could also be larger. For example, said second display unit may be a 5" screen.

In addition, the second display unit is movable with respect to the first display unit. With this movement of the second display unit, it is possible to present stimuli at different distances creating a controlled stimulation of the accommodative system, obtaining objective measurements of the ocular responses and the patient's responses.

The measuring system according to the present invention may also advantageously comprise a support on which said first display unit is mounted, said support being slidable along a main body, and said second display unit are mounted on an arm, said arm being in a swivel way attached to said main body.

Furthermore, said main body advantageously comprises a motor, which drives the swiveling movement of said second display unit.

On the other hand, according to a preferred embodiment, said support is solidified with a slide that moves along at least one longitudinal rod of the main body.

With the measuring system according to the present invention the following advantages are achieved:
- Presenting stimuli at controlled distances from the patient.
- Performing controlled jumps of the distance to the main display unit and the user
- Making progressive and controlled changes in the distance with respect to the main unit and the user.
- Making simultaneous and/or sequencing stimuli between both display units, or third systems containing 2D/3D objects (e.g. a third monitor at other distances).

Assessing accommodative function, binocular vision, and ocular motility at different distances, using 2D/3D objects.

Training accommodative visual function, binocular vision, and ocular motility at different distances, using 2D/3D objects.

Evaluating and training other neurological functions with or without visual impairment that require the presentation of objects at different distances.

BRIEF DESCRIPTION OF THE DRAWINGS

For a better understanding of what has been explained above, some drawings are included in which, schematically and only as a non-limiting example, a practical case of embodiment is represented.

DESCRIPTION OF A PREFERRED EMBODIMENT

Figure 1:
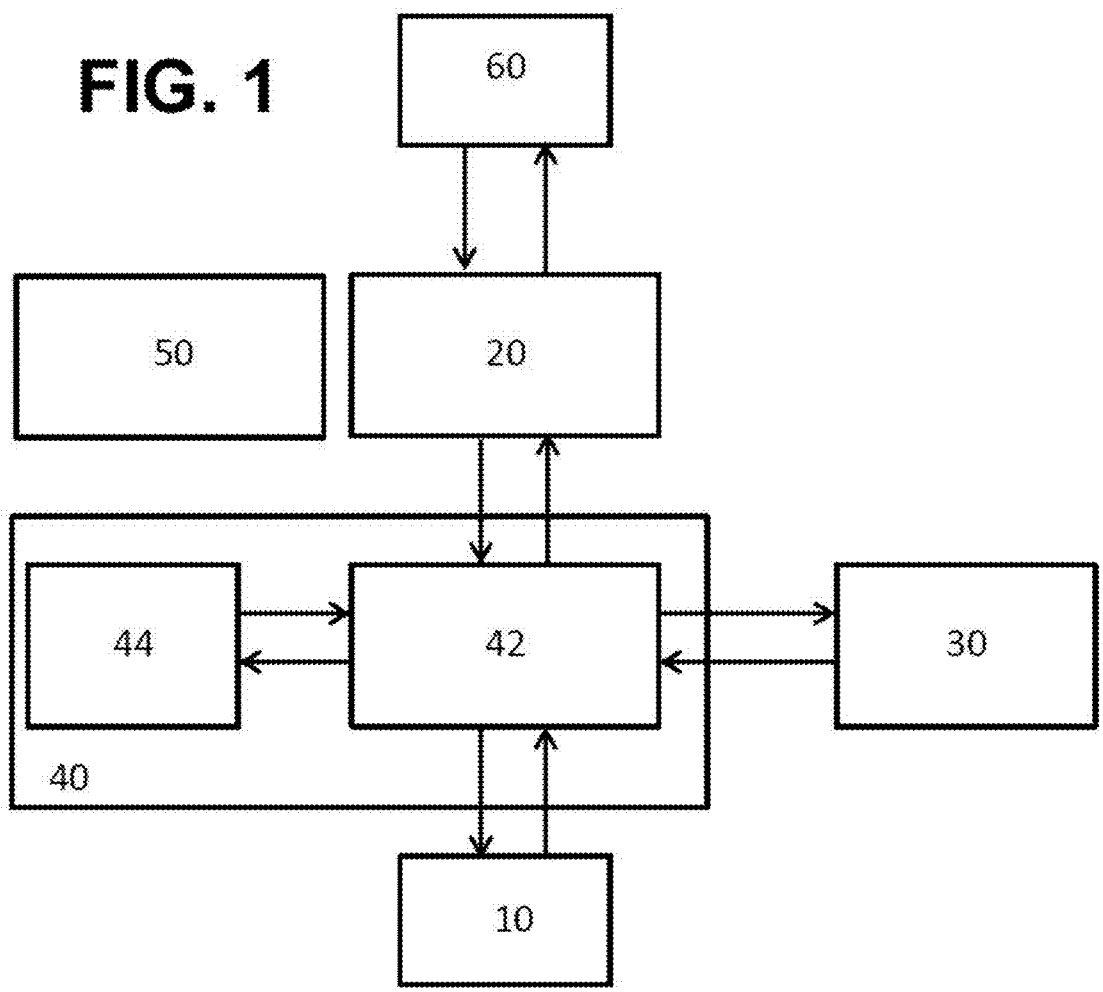
FIG. 1 is a block diagram of the components forming the system for measuring clinical parameters of visual function in accordance with the present invention.

As shown in FIG. 1, according to the presented embodiment, the measuring system according to the present invention comprises a tracking sensor 10 which is employed to periodically detect the position of the user's pupils. Thereby, not only changes of direction but also speed can be measured. Furthermore, the measuring system also comprises a motion sensor 60, which detects the movement of the user's head when using the measuring system.

Generally, the tracking sensor 10 allows multiple parameters to be measured depending on the particular test of the session. For example, the tracking sensor 10 can take values for the position of the right and left eye, for the position of the object the user is looking at (through both eyes and separately), the eye-sensor distance, the pupil size, the interpupillary distance, the eye movement speed, etc.

Generally, for taking measurements, the tracking sensor 10 includes a pair of cameras to focus on the user's eyes and capture their movement and position. This requires a sufficiently high sampling rate to capture rapid eye movements. It must also calculate the position within the generated virtual environment towards where the user is looking.

The measurement system according to the present invention also comprises a first display unit 20 with 2D/3D immersive capability that reproduces or projects for the user scenes in depth with 2D/3D objects with predetermined properties.

These scenes with 2D/3D objects function as visual function stimulation and can be selected in the system according to what is going to be done, allowing to provoke certain visual challenges in the user. Thus, a multitude of scenes with different challenges and visual stimuli can be designed for the user, either for evaluation, training of visual and/or neurological function.

The system also includes an interface 30 for user interaction. In particular, the interface receives commands from the user to control the first display unit 20 and other elements of the system. The interface 30 assists the user for their visual challenge. The system can thus measure the response to actions that the user performs in different ways, all controlled by a central system.

The system further includes processing means 40 preferably implemented as a server 42 and a terminal 44 which coordinately share the management of the first display unit 20, the control of the sensor 10 and the interface 30, so that responses can be detected by the sensor 10 and transmitted to the server 42 for the measurement of clinical parameters of visual function. Further, the first display unit 20 allows adaptation of the clinical 3D image associated with the motion. The display unit 20 may include a dissociating system (such as polarized glasses or the like).

During the visualization of the visual challenge created with concrete clinical 3D, they are measured with the tracking sensor 10 and are associated with the challenges of the second display unit.

These changes in the position of the user's pupils are detected and combined with the movements made with the user's head which are detected by the motion sensor 60. The coupling of the motion sensors 60 and the first display unit 20 allows the 3D image to be displayed adapted to the movement or position of the person, giving the user the sensation of moving through the virtual environment being viewed, that is to say, of being immersed in it.

The data is processed, and the 2D/3D object properties are associated with the triggered objects detected by the sensors 10, 60. This allows clinical parameters of visual function to be measured under reproducible and controllable conditions. The parameters required for accommodative visual function will be measured.

As indicated, simultaneously with the display of 2D/3D objects on the first display unit 20, the tracking sensor 10 records:

Position of the eyes (left and right).
Position at which each eye looks (separately).
Position at which the user looks with the combination of both eyes in the 2D/3D environment.

Also at the same time, instructions may be displayed to guide the user by explaining what to do at any given moment. These instructions may be in the form of text, video, or audio instructions via an interface 30. The interface 30 also allows the user to interact with 2D/3D objects in the scene represented by the first display unit 20.

These user responses can be, for example, among others in the form of:

Movement in front of the device (in any direction in space).
Position of the device within the virtual reality/augmented reality environment o open field.
Pressures on the device buttons.
Voice commands.

In the situation described above, for the above tasks the processing is preferably carried out on a client terminal 44 even if they have been provided from an external server 42.

Also, from the server 42 different features can be sent, such as the virtual/augmented reality environment or other environments to be used.

With respect to the data to be collected, there is data from the sensors 10, 60 and also through user interaction with the interface 30.

Once all the local processing of the data has been completed, they are grouped and sent to server 42 for storage and subsequent analysis.

For example, it is possible to check if the values obtained for some parameters are within the tolerance limits according to scientific studies stored in the server 42. On the other hand, as recommendations, a new scene can be designed to serve as therapy or training to improve some of the functionalities.

In accordance with the present invention, the measurement system also comprises a second display unit 50, which is preferably a smaller display than the first display unit 20, although it could be larger. Said second display unit 50 is also configured to represent a scene wherein at least one 2D/3D object has variable characteristics to instill a visual response in the user, wherein said variable characteristics include at least the virtual position and virtual volume of the 2D/3D object within the scene.

The first display unit 20 and the second display unit 50 are mounted on a main body 51 and 52.

In particular, the first display unit 50 is mounted on a support 51 which is integrally attached to a slide 56 which moves along said main body 52 by means of one or more rods 55.

For its part, according to the shown embodiment, the second display unit 50 is mounted on an arm 53 which is mounted in a hinged way to said main body 52, so that said display unit 50 is swingable, said second display unit 50 being able to be moved with respect to the first display unit 20.

However, it should be noted that the second display unit 50 could be moved with respect to the first display unit 20 in any suitable manner, for example longitudinally.

The movement of the second display unit 50 and/or the first display unit 20 is driven by any suitable means, for example by a motor 54.

Figure 2:
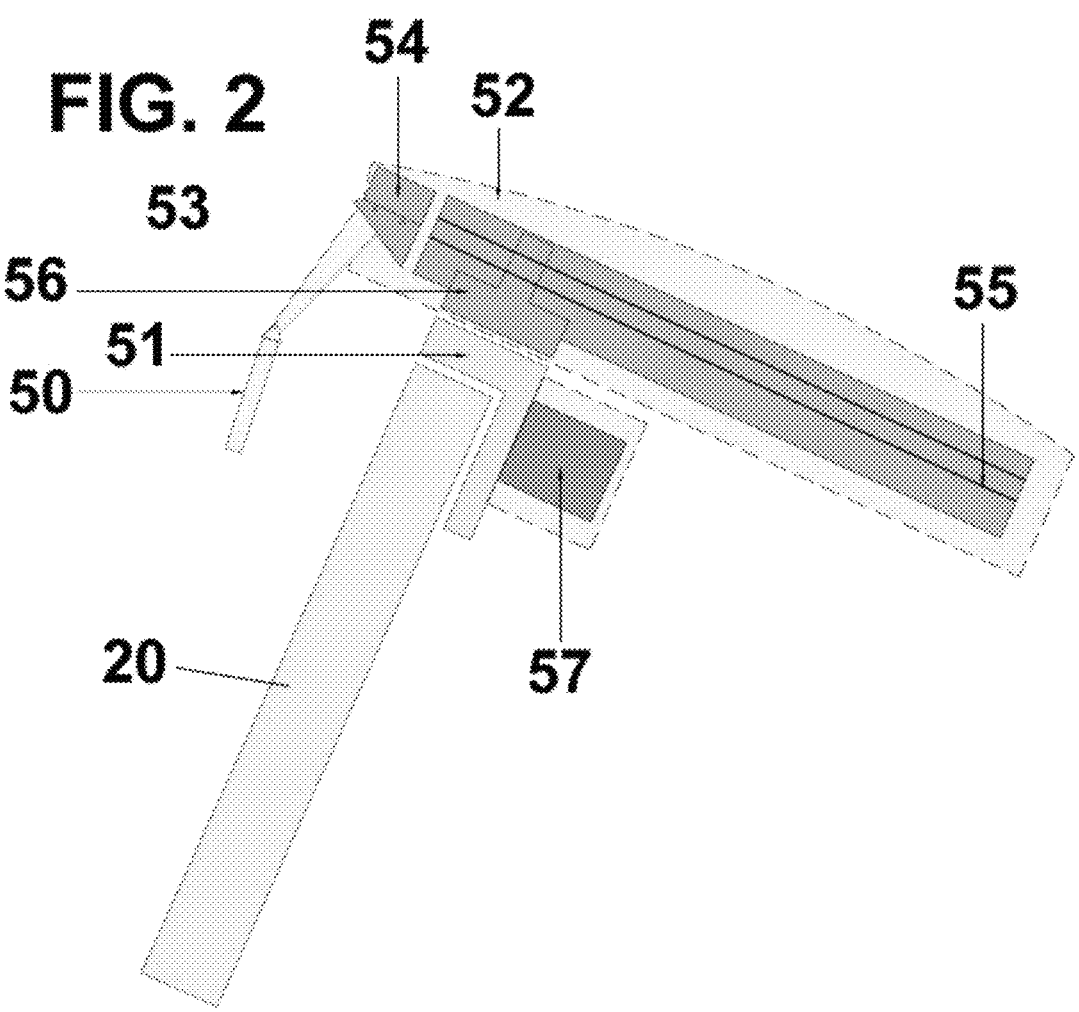
FIG. 2 is a schematic side elevation view of the system for measuring clinical parameters of visual function in accordance with the present invention.

Furthermore, as shown in FIG. 2, a housing 57 may be mounted on said support 51 which houses within it an additional power supply and/or electronic components for the correct operation of the measuring system.

The use of two display units 20, 50 allows for changes in viewing planes, focusing and visual accommodation.

Although reference has been made to a specific embodiment of the invention, it is obvious to a person skilled in the art that the measuring system described is susceptible of numerous variations and modifications, and that all the details mentioned may be replaced by other technically equivalent ones, without departing from the scope of protection defined by the appended claims.

The invention claimed is:

1. A system for measuring clinical parameters of visual function, comprising:
   a first display configured to represent a first scene including at least one first object, wherein the at least one first object has variable characteristics for instilling a visual response in a user, wherein said variable characteristics include at least a virtual position or a virtual volume of the first object within the first scene;
   an interface configured to provide a user interaction over the first scene;
   a processor configured to analyze a user response based on the association of data coming from the interface with a variation of the characteristics of the first object represented on the first display and an estimation of a plurality of clinical parameters of a user's visual function;
   a second display configured to represent a second scene wherein at least one second object has variable characteristics to instill a visual response in the user; and
   a main body comprising an arm,
   wherein the first and second displays are configured to change viewing planes, focusing, and visual accommodation of the user,
   wherein the first display is mounted on the main body, and the second display is mounted on the arm,
   wherein the system is configured to calculate a desired stimulation created by the second display, wherein the desired stimulation created by the second display achieves an objective measurement of an ocular response and the user response,
   wherein the second display is configured to move and swivel relative to the first display to adjust a position of the second display only in a limited region in which the desired stimulation is created.

2. The system for measuring clinical parameters of visual function according to claim 1, wherein said second display is smaller or larger than said first display.

3. The system for measuring clinical parameters of visual function according to claim 1, wherein said second display is movable with respect to the first display.

4. The system for measuring clinical parameters of visual function according to claim 1, comprising a support on which said first display is mounted, said support being movable along a main body.

5. The system for measuring clinical parameters of the visual function according to claim 4, wherein a main body comprises a motor, which drives a swiveling movement of said second display.

6. The system for measuring clinical parameters of the visual function according to claim 1, wherein said support is integral with a slide which moves along at least one longitudinal rod of a main body.

7. The system for measuring clinical parameters of visual function according to claim 1, wherein the visual function of the clinical parameters refers to at least one of the following: binocularity, accommodation, ocular motility, reading skills or visual perception.

8. The system for measuring clinical parameters of visual function according to claim 1, further comprising:
   a plurality of motion sensors configured to detect a position of the user's head and a distance to the first display; and
   a plurality of tracking sensors configured to detect the user's pupil position and a pupil diameter.

* * * * *